United States Patent [19]

Levy et al.

[11] 3,929,916
[45] Dec. 30, 1975

[54] PROCESS FOR THE MONONITRATION OF ORTHO-XYLENE

[75] Inventors: Stephen David Levy, Trenton, N.J.; Francis Clyde Rauch, Warrington, Pa.

[73] Assignee: American Cyanamid Company, Stamford, Conn.

[22] Filed: June 11, 1974

[21] Appl. No.: 478,189

[52] U.S. Cl. ............................................. 260/645
[51] Int. Cl.² ........................................ C07C 79/10
[58] Field of Search .................................... 260/645

[56] References Cited
OTHER PUBLICATIONS

Astle, Industrial Organic Nitrogen Compounds, Reinhold Pub. Corp., New York, 1961, pp. 314, 315 and 319.

*Primary Examiner*—Leland A. Sebastian
*Attorney, Agent, or Firm*—Harry H. Kline

[57] ABSTRACT

There is provided a process for mononitrating ortho-xylene by reacting o-xylene with catalytic amounts of nitrogen tetroxide ($N_2O_4$) or nitrogen dioxide ($NO_2$) and concentrated nitric acid in concentrations of at least 68% in the presence of a mercuric salt and an aliphatic monocarboxylic acid anhydride to obtain good yields of mononitrated o-xylene having an isomer distribution of at least a 70:30 ratio of 4- to 3- nitro-o-xylenes. Such 4- nitro-o-xylene, upon separation from the isomeric mixture, finds utility in the preparation of xylidine derived preemergence herbicides.

7 Claims, No Drawings

PROCESS FOR THE MONONITRATION OF ORTHO-XYLENE

The present invention relates to the selective nitration of o-xylene. More particularly, it relates to the mononitration of o-xylene utilizing concentrated nitric acid and catalytic quantities of nitrogen tetroxide ($N_2O_4$) or nitrogen dioxide ($NO_2$) in an aliphatic anhydride in the presence of a mercury salt to obtain mononitrated o-xylenes in good yields having at least a 70:30 ratio of 4- to 3-nitro-o-xylenes. Still more particularly, the invention is concerned with the nitration of molar quantities of o-xylene and at least a 68% concentrated nitric acid and catalytic quantities of either nitrogen tetroxide or nitrogen dioxide in the presence of a mercury salt and an inert aliphatic monocarboxylic acid anhydride to obtain mononitrated o-xylene in good yields having at least a 70:30 ratio of 4- to 3- nitro isomer distribution.

It is known that good yields of nitrated o-xylenes are obtained by utilizing a mixture of nitric acid and sulfuric acid as the nitrating agent. However, such mixed acids result in a relatively low ratio of 4- to 3- nitro-o-xylenes, namely, from about 45% 4- nitro-xylene to about 55% 3- nitro o-xylene, respectively. Unfortunately, for certain applications, the 3-nitro isomer cannot be utilized. In an attempt to improve the isomer distribution, a mercury catalyst has been incorporated into the aforementioned mixed acid nitrating medium. Here again, serious problems are encountered in that low conversions are attained employing only nitric acid and precipitation of mercuric sulfate occurs with loss of mixed acid activity in conventional mixed acid media. If a process could be developed to decrease the 3-isomer yield while increasing the 4-isomer overall yield whereby difficulties such as mercuric sulfate precipitation are avoided, such a process would fulfill a long felt need in the art.

It is, therefore, a principal object of the invention to provide a process for improving the overall yield of mononitro-o-xylene while increasing the 4- to 3- nitro-o-xylene isomer ratio to at least 70:30, respectively. It is a further object of the invention to employ an economical nitrating agent in the presence of a mercury catalyst without experiencing precipitation of mercuric sulfate, whereby the effectiveness of the nitrating agent remains unaltered. Other objects and advantages will be readily ascertained from a reading of the ensuing description.

To these ends, it has been unexpectedly found that mononitration of o-xylene occurs when o-xylene in a monocarboxylic acid anhydride is subjected to the action of concentrated nitric acid in the presence of catalytic quantities of a nitrogen tetroxide or nitrogen dioxide and in the further presence of a mercury catalyst under critical reaction conditions hereinbelow set forth. The desired 4- to 3- nitro-o-xylene isomer, absent any dinitro o-xylene derivative, is surprisingly obtained in good yield.

According to the process of the invention, an improved 4- nitro-o-xylene to 3- nitro-o-xylene ratio is attained in a straightforward manner. This is accomplished by subjecting o-xylene and a mercuric ion, preferably in the form of mercury salt, such as mercuric acetate, mercuric propionate or mercuric butyrate, at temperatures above about 20°C., and usually between about 25°C. and 80°C. It is a good practice to react about equimolar amounts of o-xylene, concentrated nitric acid, and an aliphatic monocarboxylic acid anhydride in the presence of catalytic quantities of nitrogen tetroxide or nitrogen dioxide in the further presence of from 0.01 mol to 0.08 mol of a mercury salt, such as mercuric acetate, mercuric propionate, or mercuric benzoate per mol of o-xylene at a temperature ranging from about 55°C. to 65°C. to attain optimum yields of desired isomer distribution. The time of reaction can vary from about one hour to about eight hours. Advantageously, relatively inexpensive nitric acid of at least 68% concentration is employed while maintaining its concentration at high levels of not less than 68% due to the presence of said anhydride. In the overall reaction, water of reaction is withdrawn by the presence of the anhydride which absorbs the water. In this manner a 4-nitro to 3- ratio of nitro-xylene ratio is increased from about 45:55, respectively, to about 70:30, and higher, respectively, and an overall yield of from 70 to 95%, or higher, is obtained while utilizing both nitrogen tetroxide or nitrogen dioxide catalytically and concentrated nitric acid.

In a preferred embodiment, o-xylene and acetic anhydride in equimolar quantities are admixed with a mercuric salt maintained at about 60°C. while introducing concentrated nitric acid and catalytic amounts of gaseous nitrogen tetroxide. The reaction is terminated when approximately 80% of the o-xylene has been converted principally to a 75:25 isomer mixture of 4- and 3- nitro-o-xylene determined by vapor phase chromatography. During reaction, no dinitro products are formed. Resultant mixture is then distilled to remove acetic acid formed from the anhydride water reaction and unreacted o-xylene which are recycled to the reactor to which nitrogen tetroxide and additional o-xylene are introduced. The mercury is separated from the organic phase after treating the crude nitro-o-xylene, mercury mixture with chlorine gas in the presence of aqueous hydrochloric acid. The so separated aqueous phase is next treated with iron to form a mercury/iron amalgam which is recycled to the reactor. The organic phase which contains the crude nitro-o-xylene is subjected to fractional distillation to separate the 4-nitro-o-oxylene from the 3-nitro isomer to obtain at least a 70 – 75% yield of 4-nitro-o-xylene, based on converted o-xylene.

Advantageously, minimal by-products are obtained during reaction, particularly when terminating the reaction after 80% of the o-xylene has been converted. Further, no dinitro-o-xylene derivatives are formed. These occur in the mixed acid nitrating process of the prior practice.

In general, equimolar amounts of o-xylene, an aliphatic monocarboxylic acid anhydride, such as acetic anhydride, propionic anhydride, butyric anhydride, and concentrated nitric acid are reacted. Slight excesses of either reactant can be tolerated. However, the concentration of the nitric acid per se should be maintained during reaction a levels between 68 and 98%. Where the concentration of the nitric acid falls below 68%, the desired ratio of 4-nitro to 3- nitro o-xylenes cannot be obtained.

As above stated, catalytic quantities of nitrogen tetroxide or nitrogen dioxide and mercury salt are incorporated during reaction. However, by "catalytic quantities" is meant the presence of from 0.02 to 0.1 mol of nitrogen tetroxide or nitrogen dioxide per mol of o-xylene and from 0.01 mol to 0.08 mol of mercuric salt per mol of o-xylene.

The invention will be illustrated in conjunction with the following examples which are to be taken as illustrative only and not by way of limitation. All parts are by weight, unless otherwise noted.

EXAMPLE 1

To a suitable reaction vessel equipped with thermometer and gas inlet are introduced 0.05 mol of mercuric acetate dissolved in 1 mol of o-xylene. The mixture is heated to 60°C. Simultaneously are then added 1 mol of acetic anhydride and 1 mol of 80% nitric acid while introducing 0.08 mol of nitrogen tetroxide into the reaction mixture. The progress of the reaction is followed by periodically withdrawing samples and analyzing for xylene and nitro-xylenes by vapor phase chromatography. The total time for reaction is six hours. The concentration level of the nitric acid is maintained between 72 and 75%. After 80% completion of the reaction as indicated by vapor phase chromatography, the reaction is terminated by pouring the mixture into water which results in the separation of an aqueous phase from an organic phase. The latter phase is extracted with chloroform and washed with water. The chloroform is next evaporated and the residue is weighed, redissolved in chloroform and analyzed by vapor phase chromatography. There is obtained a nitro-o-xylene, free of dinitro-o-xylenes, analyzing as 80 parts of 4-nitro-o-xylene and 20 parts of 3-nitro-o-xylene. Total yield of 4-nitro-o-xylene amounts to 75%, based on the weight of o-xylene.

EXAMPLE 2

This example illustrates the use of mixed acid nitrating agent.

The procedure of Example 1 is followed in every respect except that a mixture of 0.5 mol of concentrated nitric acid and 0.5 mol of concentrated sulfuric acid is substituted for the concentrated nitric acid, acetic anhydride, nitrogen tetroxide mixture as the nitrating mixture. There is obtained an isomer ratio of 45:55 of 4-nitro-o-xylene to 3-nitro-o-xylene, respectively.

EXAMPLE 3

The procedure of Example 1 is repeated in every detail except that the overall time is reduced from six hours to four hours. There is obtained an isomer ratio of 73:27 of 4-nitro-o-xylene to 3-nitro-o-xylene, respectively.

EXAMPLE 4

The procedure of Example 1 is repeated in every detail except that a reaction temperature of 35°C. and a nitrating mixture of 1.0 mols of nitric acid (68%), 0.05 mol of nitrogen dioxide and 1.3 mols of acetic anhydride are employed. Upon analysis, a ratio of 76:24 of 4-nitro-o-xylene and 3-nitro-o-xylene, respectively, is noted with an overall yield of 80% 4-nitro-o-xylene, based on the weight of the o-xylene reactant. No dinitro-xylenes are detected.

In each of the above examples, it is to be clearly understood that the concentration of the nitric acid per se to be maintained during reaction at a level of from between 68 and 98% is defined as a ratio of the weight of nitric acid to the weight of nitric acid plus water. This ratio then is maintained between 0.68 and 0.98, and preferably between 0.72 and 0.80.

We claim:

1. A process of mononitrating o-xylene which comprises the steps of: reacting at least equimolar amounts of o-xylene, concentrated nitric acid of at least 68% and a lower aliphatic monocarboxylic acid anhydride in the presence of both catalytic amounts of nitrogen dioxide or nitrogen tetroxide and a mercury salt at a temperature of from 25°C. to 80°C. for from about 1.5 hours to 8.0 hours, maintaining the nitric acid concentration to at least 68%, and recovering mononitro-o-xylene in good yield and having an isomer distribution ratio of at least 70:30 of 4-nitro-o-xylene to 3-nitro-o-xylene, respectively.

2. The process according to claim 1 wherein from 0.02 to 0.1 mol of nitrogen tetroxide or nitrogen dioxide, and from 0.01 mol to 0.08 mol of a mercury salt are reacted.

3. The process according to claim 1 wherein 0.05 mol of mercuric acetate as the mercury salt and from 0.03 to 0.08 mol of nitrogen tetroxide or nitrogen dioxide are reacted.

4. The process according to claim 1 wherein the mercury salt is mercuric propionate.

5. The process according to claim 1 wherein the mercury salt is mercuric butyrate.

6. The process according to claim 1 wherein the nitration reaction is terminated when 80% of the o-xylene reaction is converted to mononitro-o-xylene.

7. The process according to claim 1 when the concentration of the nitric acid is maintained at levels ranging from 68 to 98%.

* * * * *